US006357644B1

(12) United States Patent
Lipschutz

(10) Patent No.: US 6,357,644 B1
(45) Date of Patent: Mar. 19, 2002

(54) VEHICLE THEFT PREVENTION DEVICE STORAGE SYSTEM

(76) Inventor: Jay Lipschutz, 11807 Dumont Rd., Philadelphia, PA (US) 19116

(*) Notice: Subject to any disclaimer, the term of this patent is extended or adjusted under 35 U.S.C. 154(b) by 0 days.

(21) Appl. No.: 09/566,663

(22) Filed: May 8, 2000

(51) Int. Cl.⁷ .................................................. B60R 7/04
(52) U.S. Cl. ........................ 224/539; 224/563; 224/571
(58) Field of Search ................................ 224/539, 543, 224/545, 563, 567, 571, 275, 483, 242, 243, 246, 915, 566

(56) References Cited

U.S. PATENT DOCUMENTS

| 782,357 | A | * | 2/1905 | Pogus | 224/915 X |
|---|---|---|---|---|---|
| 2,922,515 | A | * | 1/1960 | Barnes | 224/915 X |
| 5,810,222 | A | * | 9/1998 | Shoemaker | 224/243 X |
| 5,865,502 | A | * | 2/1999 | Ayers et al. | 224/275 X |
| 5,894,973 | A | * | 4/1999 | Stone | 224/275 |

* cited by examiner

Primary Examiner—Gregory M. Vidovich
(74) Attorney, Agent, or Firm—Arnold D. Litt

(57) ABSTRACT

A holster storage system for a vehicle anti-theft device, comprising a structure within which the anti-theft device may be stored and further in which the anti-theft device-containing holster may be secured to an interior surface of the vehicle when the anti-theft device is not in use.

6 Claims, 4 Drawing Sheets

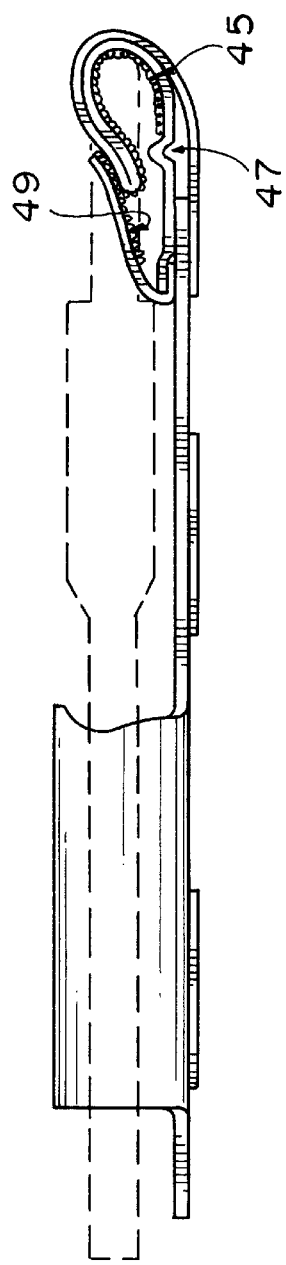
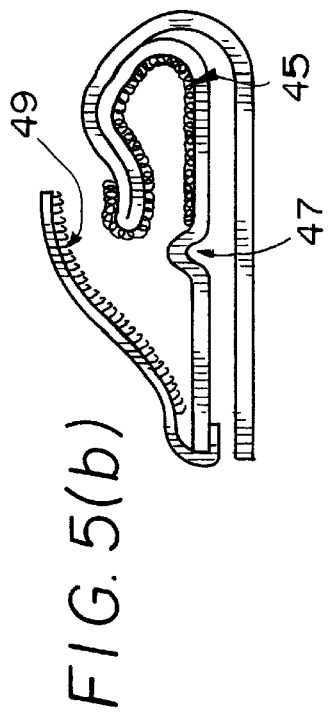
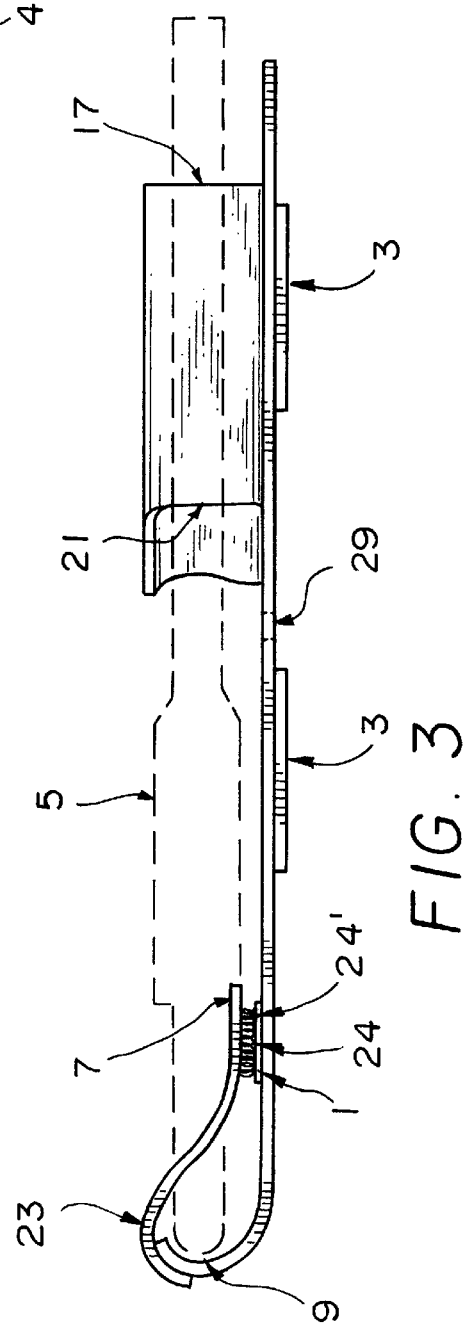

VEHICLE THEFT PREVENTION DEVICE STORAGE SYSTEM

BACKGROUND OF THE INVENTION

1. Field of the Invention

The Invention relates to a storage system for a vehicle theft prevention device.

2. Background of the Invention

Car theft has become a major problem throughout the United States, and many products have been developed to prevent and deter would-be thieves from stealing automobiles and the goods stored therein.

The vast majority of products are releasably secured to control functions of the automobile when the owner leaves the automobile and are intended to prevent a thief from using the car in a conventional manner. For example, bars may be secured to the steering wheel in a manner preventing a thief from properly steering. Similarly, a rod may be positioned between the steering wheel and the brake pedal, or acceleration pedal, to prevent a thief from properly stopping, steering or accelerating the vehicle. Devices are also known that may be secured to the gear shift to prevent a thief from shifting the automobile out of "Park". The prior art describes anti-theft devices such as "The Club", cane-type and numerous other types of locking devices that may be applied to the steering wheel, brake, gear shift, handbrake and the like.

While these devices are generally effective in preventing a thief from operating the vehicle once entered, a serious problem has been encountered by the users of the vehicles in storing what are usually bulky mechanical systems. This creates a substantial immediate danger in the event of an accident in that the anti-theft device can be thrown throughout the passenger compartment, possibly hitting and causing serious bodily damage to the passengers. None of the prior art systems or references teach a storage system which is simple to use, simple and economical to manufacture and provides the necessary safety for the passengers in the passenger compartment of the automobile.

SUMMARY OF THE INVENTION

The primary object of the present invention is to provide a storage system for an anti-theft device that will overcome the shortcomings of prior art devices.

Another object is to provide a storage device that will hold the vehicle anti-theft device in a safe place in the vehicle when not in use.

An additional object is to provide a storage system for an anti-theft device in which the storage system will be conveniently located in the vehicle and will afford easy access to the user for simple insertion and removal of the anti-theft device therefrom.

A further object is to provide a storage system for a vehicle anti-theft device that is not expensive to manufacture and which is reasonably priced for the ultimate consumer.

Further objects of the invention will appear as the description proceeds.

To the accomplishment of the above related objects, this invention may be embodied in the form illustrated in the accompanied drawings, attention being called to the fact, however, that the drawings are illustrative only, and that changes may be made in the specific construction illustrated and described within the scope of the appended claims.

BRIEF DESCRIPTION OF THE DRAWINGS

FIG. 3 is a side elevational view of the holster with portions broken away to better illustrate the component parts.

FIG. 5(A) is a perspective side elevational view of the holster with portions broken away.

FIG. 5(B) is a perspective side elevational view of another embodiment of the holster with portions broken away.

DETAILED DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
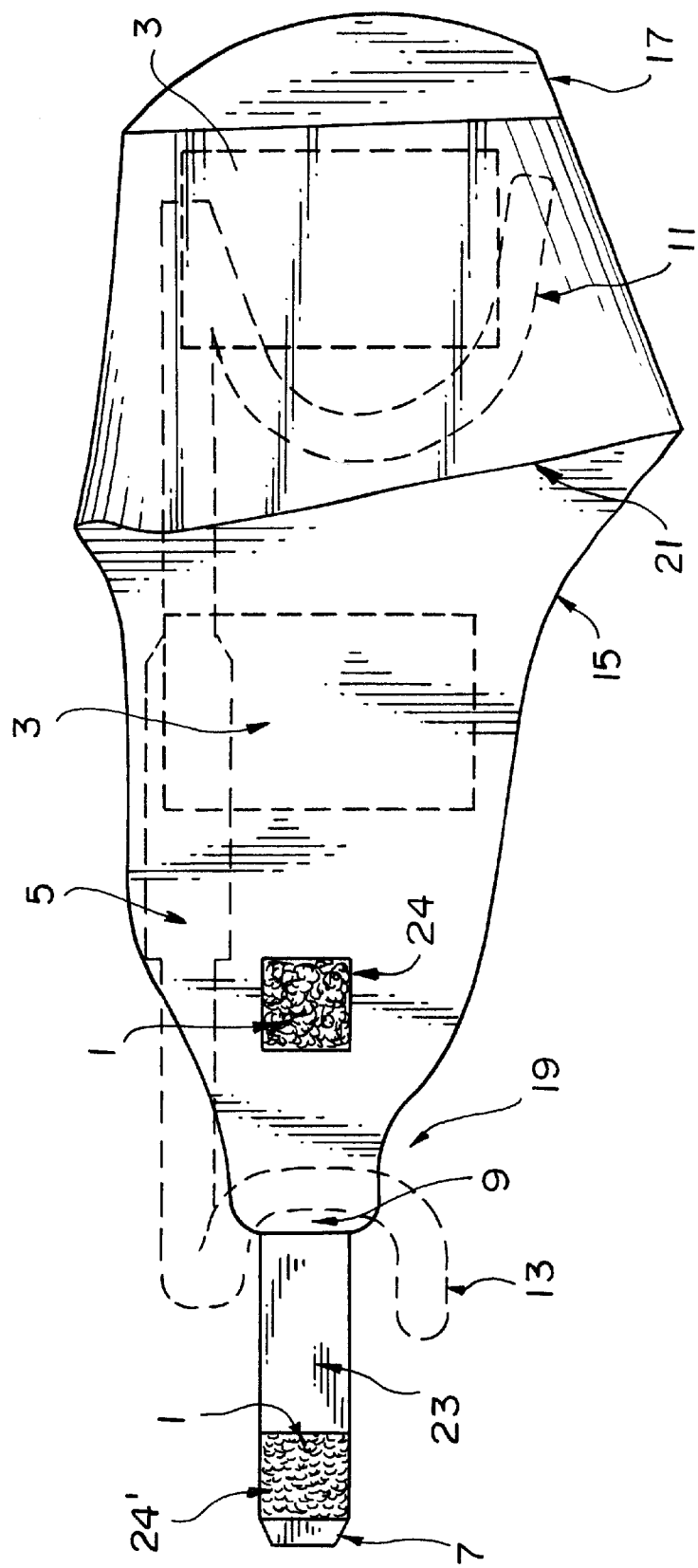
FIG. 1 is a side elevational view of the holster with portions thereof broken away to better illustrate the component parts.
Figure 2:
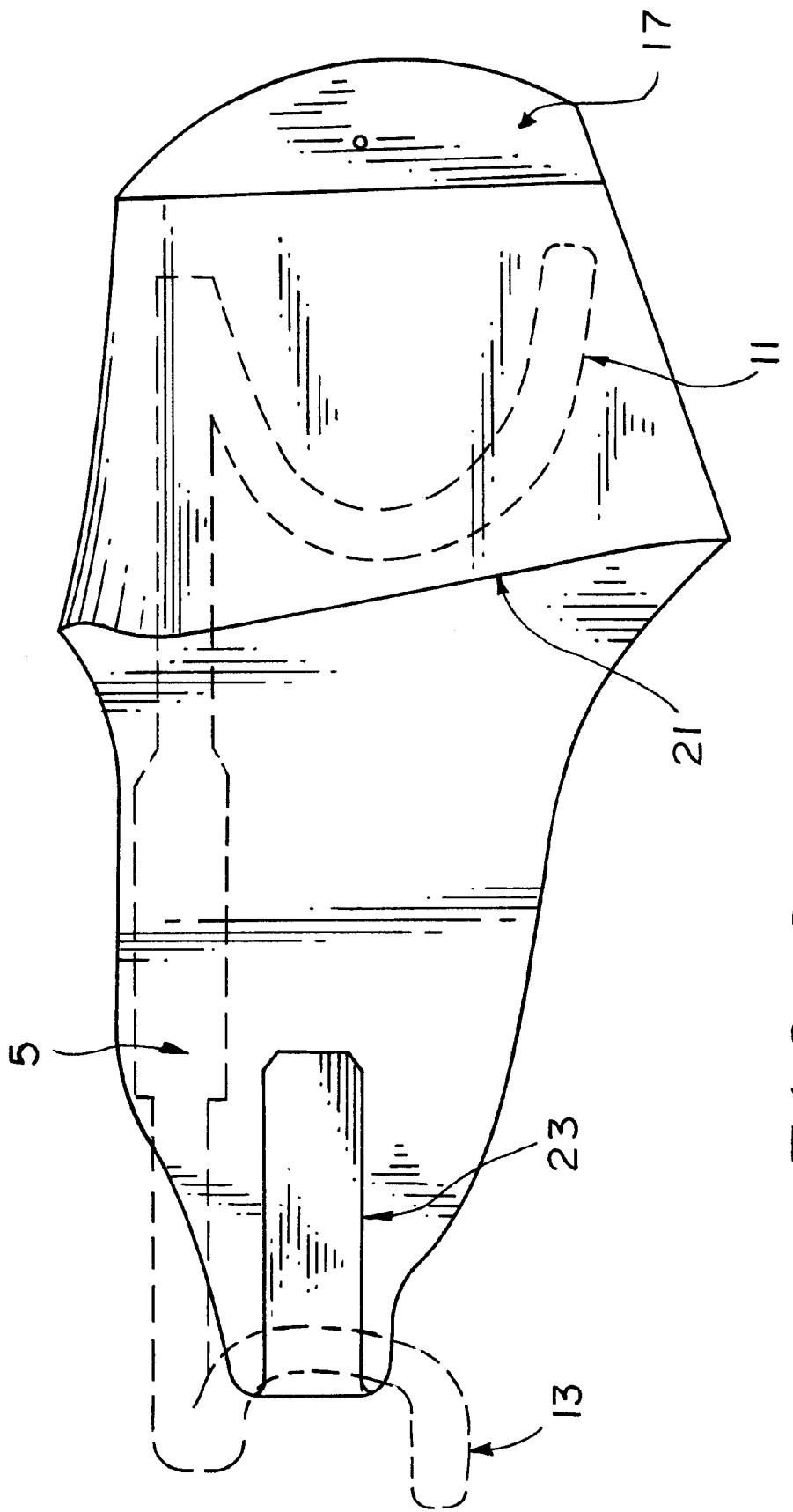
FIG. 2 is a front elevational view of the holster with portions thereof broken away, and showing the closed configuration of the security clip.

With reference to FIGS. 1 and 2, the holster 15 is shown in a side elevational view. As seen, the holster in this embodiment is elongated and tapered with an enlarged open end 21 within which the anti-theft device 5 will fit, and a tapered lower end 17. The anti-theft device 5 comprises an elongate rod-like body having two radially extending substantially coplanar hook-like elements opening outwardly towards the ends of the body, one opening upwardly 13 and one opening downwardly 11, with locking means for adjustment of the length of the body between the hooks so that it may be made longer or shorter. The anti-theft device shown in this embodiment is commonly known as the "The Club" and is generally utilized to lock the steering wheel of a vehicle thereby preventing operation of the wheel. However, it is within the purview of this invention that other types of cane or rod-type locking devices for steering wheels, brakes, gear shifts, handbrakes and the like can be accommodated within the holster without departing from the spirit of the instant invention.

The tapered configuration of the lower end of the holster 17 permits the downwardly opening hook-like element of the anti-theft device to fit snugly therein so that there is minimal slippage within the holster itself. The lower end of the holster 17 comprises a cavity(as shown in FIG. 3). As shown in FIG. 1 and FIG. 2, this embodiment contemplates that the lower end of the holster 17 will be closed; however, if desired the lower end of the holster 17 may be opened as shown in FIG. 3.

At the upper end 19 of the holster, there is a flexible U-shaped member 9 (shown more clearly in FIG. 3) which extends downwardly from the rear surface of the holster, formed to releasably receive the upwardly opening hook-like element 13 of the anti-theft device 5. Extending from the U-shaped member is a flexible first fastening means 23 which in this embodiment comprises an elastic strap with a first fastening means 24[1] comprising a well known hook and pile fabric fastener 1 sometimes known commonly as Velcro, at one end of the strap. The elastic strap is in cooperating relationship with a second fastener means 24 situated on the front surface of the holster comprising the mating hook and pile fabric fastener (commonly known as Velcro, whereby when the first and second fastening means are brought into contact, the upwardly opening hook-like element of the anti-theft device 13 is releasably secured into position in the holster. In effect, the elastic strap acts as a security clip as more clearly shown in FIG. 2.

With reference to FIG. 3, this side elevational view shows one embodiment of the holster in which the tapered lower end 17 is open. In this embodiment, the tapered sides of the lower end of the holster 17 create pressure on the lower end of the anti-theft device to hold it in place and prevent slippage from the holster. As seen from FIG. 3, the downwardly opening U-shaped member 9 in effect cradles the downwardly opening hook-like element 11 of the anti-theft device. When the first fastening means $24^1$ is brought into contact with fastening means 24, the anti-theft device is securely held within the holster.

In this embodiment of the invention, hole 29 is provided for a mounting screw, whereby the holster is mounted to an interior surface of the automobile or other vehicle. However, a Velcro-type fastening device 3 may be attached to the rear surface of the holster and act as a mounting means when the holster is brought into contact with a carpeted or cloth surface within the vehicle. Alternatively, a combination of a screw mounting system and Velcro-type mounting system can be envisioned in connection with mounting the holster to a surface in the vehicle. Other mounting systems such as cooperating male/female snaps may also be envisioned.

Figure 4:
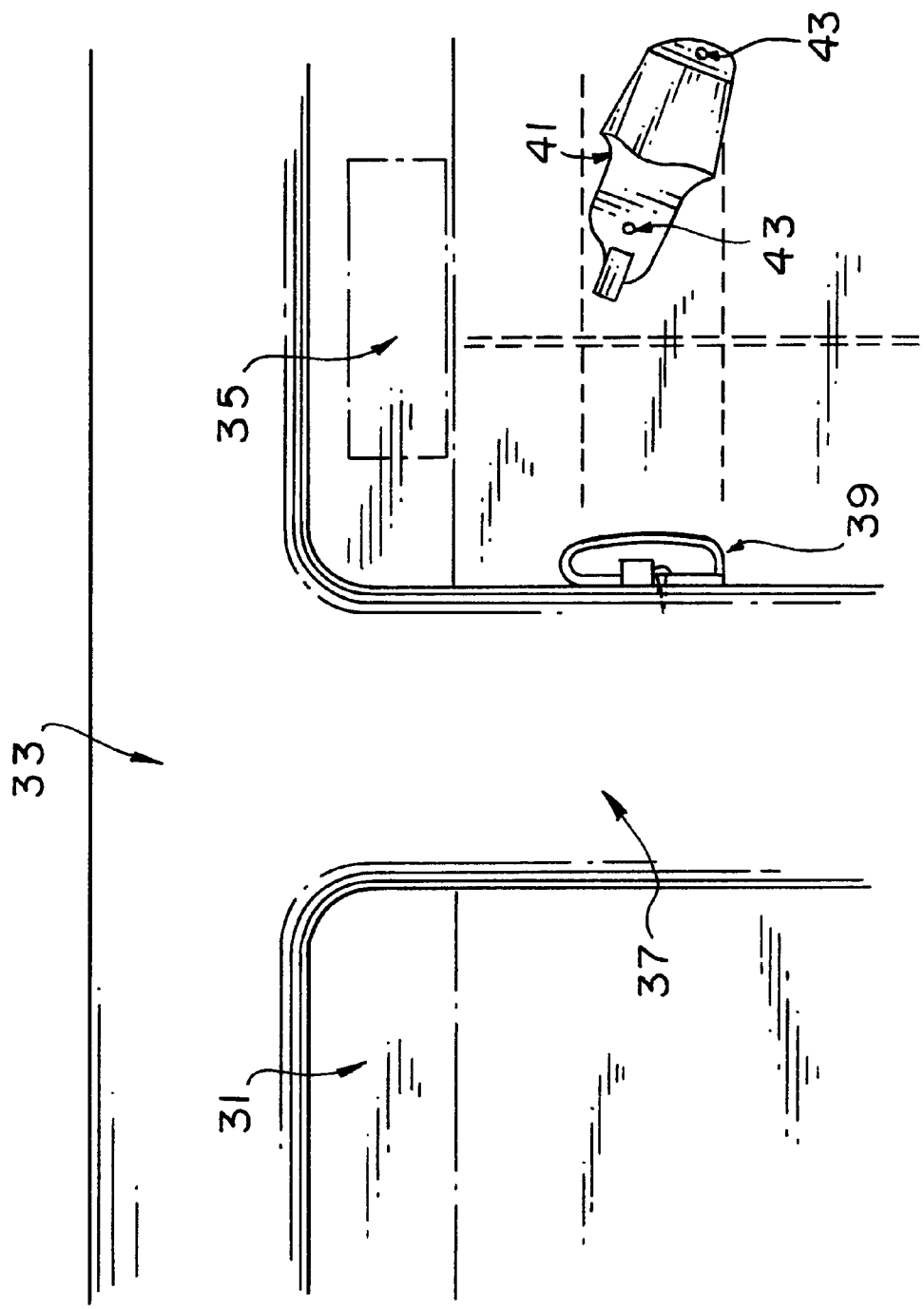
FIG. 4 is a perspective view of a vehicle with parts broken away, showing the holster mounted therein.

With reference to FIG. 4, an interior perspective of a motor vehicle is shown, with the driver seat 31, the passenger seat 35 and the center console 37 there between. 33 represents the dashboard. In this perspective, the holster 15 is attached to a side surface 39 of the center console next to the passenger seat 35. Holes 41 and 43 for mounting screws are shown but, again, other fastening embodiments may be envisioned in which the mounting device comprises Velcro-type systems. In the event of an accident or sharp turn, the anti-theft device is secured within the holster thereby preventing it from exiting on impact or panic breaking and potentially causing bodily injury to the passengers in the vehicle.

In operation, to secure the anti-theft device in the holster when driving, the lower end is inserted into the holster as shown in FIGS. 1 and 2. The downwardly opening hook portion of the anti-theft device is then pushed down and the security clip fastened about it; thereafter, the anti-theft device hook is slid up into the security clip. In order that adequate grasping of the downwardly opening hook-like element 11 of the anti-theft device is provided within the security clip, it is contemplated in one embodiment of the invention that the U-shaped member will be on the one hand flexible enough to accommodate different sizing of the hook-like element of the anti-theft device, but rigid enough to provide surface to surface pressure on the hook-like member to secure it within the security clip in its closed configuration (as shown in FIG. 3).

While any suitable material may be used to fabricate the holster, it should be characterized as being a strong and durable material such as rubber or soft plastic. In one embodiment, the holster may be fabricated from a combination of materials such as plastic and metal which is characterized by having sufficient elasticity to accommodate different sized anti-theft devices, but having sufficient rigidity so as to hold the anti-theft device in position within the holster. Specific materials include polyvinyl chloride-based materials, polystyrene-based materials and polyolefin-based materials such as polypropylenes and polyethylenes. Most preferred is polyvinyl chloride based materials which are inexpensive, readily available and easily adaptable into the holster configuration of the subject invention. The holster may be fabricated in separate parts which are then joined together or, alternatively, injection molding may be used to form the entire holster in one piece.

A most preferred embodiment of the invention is shown in FIG.5(A) and 5(B) which is an alternative of FIG.3. Here, [the] a security clip comprises Velcro on the loop side, 45, and the hook side, 49, of the security clip. The security clip with Velcro on both sides, has added strength relative to that shown in FIG. 3. The loop side is used inside the hook closure to prevent "squeak" resulting from movement of the Club and to allow for better securing of the Club. Molded ridge, 47, is used to prevent the upper hook of the Club from sliding forward.

The removal of the anti-theft device from the holster is essentially a reversal of its insertion; namely, lifting of the security clip, pushing the upper hook-like element of the anti-theft device down, pulling the club out of the holster completely and inserting it into the wheel to thereby lock it in place. In another embodiment, the holster itself may be removed from its mounting position within the vehicle prior to removal of the anti-theft device from the holster.

While a preferred embodiment of the invention relates to an automobile, other suitable vehicles such as boats, wave runners, ski mobiles, planes and the like are also applicable in the context of the subject invention.

While various preferred embodiments have been shown and described, it will be understood that there is no intent to limit the invention by such disclosure, but rather, it is intended to cover all modifications and alternative construction falling within the spirit and scope of the invention as defined in the appended claims.

What is claimed is:

1. A holster storage system for a vehicle anti-theft device of the type comprising an elongate rod-like body having two radially extending substantially coplanar upwardly and downwardly opening hook-like elements opening outwardly toward the ends of the body, with locking means for adjustment of the length of the body between the hook-like elements to allow positioning of the device in a locked fashion on the steering wheel of a vehicle to materially interfere with the operation of the steering wheel, said storage system comprising:

an elongate tapered holster comprising front and rear surfaces having upper and lower ends, the upper end being open and enlarged relative to the smaller lower end, thereby defining a cavity formed to receive said vehicle anti-theft device in its enlarged open end, wherein the downwardly opening hook-like element of the anti-theft device is positioned in the lower end of the holster and the upwardly opening hook-like element of the anti-theft device is positioned in the upper end of the holster;

a flexible U-shaped member extending downwardly from the upper end of the holster formed to releasably receive the upwardly opening hook-like element of the anti-theft device;

and first fastening means situated near the end of the U-shaped member in cooperating relationship with second fastening means situated on the front surface of the holster, whereby when the first and second fastening means are brought into contact, the upwardly opening hook-like element of the anti-theft device is releasably locked into position.

2. The flexible fastening means of claim 1 wherein the first fastening means comprises a hook and pile fabric fastener and the second fastener means comprises the mating hook and pile fabric fastener.

3. The holster of claim 1 containing a vehicle fastening means on the front or rear surface thereof to permit releasable fastening of the holster to an interior surface of the vehicle.

4. The vehicle fastening means of claim 3 comprising male and female snaps.

5. The flexible U-shaped member of claim 1 comprising an outer surface and an inner hook surface wherein fastening means for better securing of the anti-theft device are situated on the inner hook surface of the U-shaped member.

6. The flexible U-shaped member of claim 1, wherein a molded ridge is situated to prevent movement of the vehicle anti-theft device.

\* \* \* \* \*